United States Patent
Goldstein et al.

(10) Patent No.: US 7,203,459 B2
(45) Date of Patent: Apr. 10, 2007

(54) MODE ADAPTATION IN WIRELESS SYSTEMS

(75) Inventors: Yuri Goldstein, Southbury, CT (US); Yuri Okunev, Southbury, CT (US)

(73) Assignee: PCTEL, Inc., Milpitas, CA (US)

( * ) Notice: Subject to any disclaimer, the term of this patent is extended or adjusted under 35 U.S.C. 154(b) by 501 days.

(21) Appl. No.: 10/406,776

(22) Filed: Apr. 3, 2003

(65) Prior Publication Data

US 2004/0203465 A1    Oct. 14, 2004

(51) Int. Cl.
*H04B 17/00*    (2006.01)
(52) U.S. Cl. ................. 455/67.11; 455/67.13; 375/227; 375/221
(58) Field of Classification Search ............ 455/67.11, 455/67.13, 67.14, 63.1, 69, 226.3; 375/227, 375/221, 222, 225; 370/338, 252, 332
See application file for complete search history.

(56) References Cited

U.S. PATENT DOCUMENTS

| | | | | |
|---|---|---|---|---|
| 6,108,374 A | * | 8/2000 | Balachandran et al. | ..... 375/227 |
| 6,898,198 B1 | * | 5/2005 | Ryan et al. | ............ 370/338 |
| 7,076,225 B2 | * | 7/2006 | Li et al. | ................. 455/245.1 |

OTHER PUBLICATIONS

*Wireless LAN Medium Access Control (MAC) and Physical Layer (PHY) Specifications in the 5 Ghz Band*, IEEE 802.11a, Sections 17.2, 17.3., 17.5., date unknown.
*HiperLAN2: Broadband Wireless Communications at 5 Ghz*, P. Schramm et al., IEEE, vol. 40, No. 6, Jun. 2002.
*Digital Communications*, J. Proakis, 4th Edition, McGraw-Hill, 2001, Sections 5.2.9, 14.5, date unknown.
*Minimum BER Power Loading for OFDM in Fading Channel*, L. Goldfeld et al., IEEE Transactions on Communications, vol. 50, N11, 2002, date unknown.

* cited by examiner

*Primary Examiner*—Matthew D. Anderson
*Assistant Examiner*—Sanh Phu
(74) *Attorney, Agent, or Firm*—Gordon & Jacobson, P.C.

(57) ABSTRACT

Methods, apparatus, and systems for mode assignment and mode adaptation to channel conditions are provided which are based on estimations of real signal-to-noise ratios (SNR) for each frequency carrier bearing information during a data transmission session. The invention utilizes two principal procedures: signal-to-noise ratio (SNR) estimation, and a corresponding mode assignment. SNR estimation is obtained by an averaging of squared Euclidean distances between normalized received signals and reference signals corresponding to either current hard decisions from the output of a demodulator or soft decisions provided by a decoder, for each frequency carrier bearing random information. Using the SNR estimations, various algorithms for determining mode assignment are provided.

51 Claims, 8 Drawing Sheets

MODE ADAPTATION IN WIRELESS SYSTEMS

BACKGROUND OF THE INVENTION

1. Field of the Invention

The present invention relates to telecommunications methods, apparatus, and systems. The present invention more particularly relates to mode assignment and mode adaptation to channel conditions in wireless telecommunications systems utilizing single carrier or multicarrier data transmission.

2. State of the Art

Wireless telecommunication and data transmission systems, as a rule, utilize several operational modes, depending on radio channel quality. For example, for data transmission rates between 6 Mbits/s and 54 Mbits/s the American IEEE 802.11a WLAN standard specifies eight different modes, while the European HiperLAN2 WLAN standard specifies seven different modes. The modes are specified in Table 1:

TABLE 1

| Mode # | Data Rate (Mbits/s) 802.11a | Data Rate (Mbits/s) HiperLAN | Modulation 802.11a | Modulation HiperLAN | Coding Rate 802.11a | Coding Rate HiperLAN |
|---|---|---|---|---|---|---|
| 1 | 6 | 6 | BPSK | BPSK | 1/2 | 1/2 |
| 2 | 9 | 9 | BPSK | BPSK | 3/4 | 3/4 |
| 3 | 12 | 12 | QPSK | QPSK | 1/2 | 1/2 |
| 4 | 18 | 18 | QPSK | QPSK | 3/4 | 3/4 |
| 5 | 24 | 27 | 16-QAM | 16-QAM | 1/2 | 9/16 |
| 6 | 36 | 36 | 16-QAM | 16-QAM | 3/4 | 3/4 |
| 7 | 48 | 54 | 64-QAM | 64-QAM | 2/3 | 3/4 |
| 8 | 54 | — | 64-QAM | — | 3/4 | — |

From Table 1 it can be seen that the various modes differ in both modulation techniques and encoding parameters. Therefore, the proper mode should be set up in a transmitter and in a receiver in advance for each communication session. However, the standards do not specify a procedure of mode setting up or mode adaptation to channel conditions.

The IEEE 802.11a standard indicates that it is the responsibility of the MAC (Media Access Control) layer to assign the proper mode. The only signal parameter mentioned in the IEEE 802.11a standard which can be used for mode assignment and mode adaptation to channel conditions is the RSSI—Receive Signal Strength Indicator (see, IEEE 802.11a, Wireless LAN Medium Access Control (MAC) and Physical Layer (PHY) specification in the 5 GHZ Band, Sections 17.2, 17.3, 17.5). According to the IEEE standard, the RSSI is a measure of the RF energy received by the OFDM PHY. In particular, the RSSI is a measure of the energy observed at the antenna used to receive the current PPDU (PPDU is the PHY signal, including preamble, header, data, tail and pad bits). The RSSI is measured during the 16 μs PLCP preamble (PLCP—physical layer convergence procedure), and the RSSI is a monotonically increasing function of the received power. RSSI indications of up to eight bits are supported.

The IEEE standard does not indicate how MAC and PHY should use the RSSI; but it says that RSSI may be used as a part of the CCA (Clear Channel Assessment) scheme. CCA is determined in the IEEE standard as a PHY mechanism, which shall detect a medium busy condition and report the result to the MAC. The CCA indication has two states—BUSY and CLEAR, and the MAC considers this indication before issuing the permission for signal transmission. The IEEE standard also explains that a receive level more than −82 dBm shall cause CCA to indicate the BUSY state with a probability >90% within 4 μs of the preamble. If the preamble was missed, the receiver should hold the carrier sense (CS) signal busy for any signals above −62 dBm.

Apparently, the RSSI is a sufficiently reliable parameter for clear channel detection through the CCA mechanism. However, it is not reliable parameter for mode assignment and mode adaptation. The main disadvantage of RSSI as a basis for mode assignment and for the adaptation procedure is that the RSSI is an ambiguous function of the signal-to-noise ratio (SNR) or signal-to-interference ratio (SIR) which determines real performance of the system.

The HiperLAN2 standard also does not specify a procedure for determining the mode. However, it does indicate that the system uses a link adaptation scheme; i.e., based on link quality measurements, the PHY layer mode is adapted to the current link quality. This link adaptation is in both downlink and uplink (each HiperLAN2 frame includes fields for both downlink and uplink transmissions).

The adaptation procedure for the HiperLAN2 standard can be described as follows. An access point (AP) receiver measures the uplink quality and determines which mode the transmitter of the Mobile Terminal (MT) shall use for uplink data transmission (it being noted that the algorithm of making that determination is not specified). The AP sends the corresponding request to the MT within the Frame Channel (FCH), which is a fixed field in the MAC frame. In a similar way, the MT measures the downlink quality and signals a mode suggestion to the AP transmitter. The MT then sends the corresponding request to the AP within the Resource Request (RR) field.

It will be appreciated by those skilled in the art that the adaptation procedure in the HiperLAN2 standard is based on a measurement of the link quality, but the algorithm and measured parameters are not defined. So, the problem of channel quality measurement is still unsolved in the existing standards. Meanwhile, optimization of mode assignment and mode adaptation to channel conditions remains an important issue of wireless system design.

SUMMARY OF THE INVENTION

It is therefore an object of the invention to provide methods and systems for providing radio channel quality measurement based on estimation of the real signal-to-noise ratio for each frequency carrier bearing information.

It is an additional object of the invention to provide algorithms for mode assignment and mode adaptation to channel conditions based on real signal-to-noise estimates.

It is another object of the invention to provide signal-to-noise estimations which do not require complex procedures and can be implemented utilizing the existing demodulation and decoding means.

It is a further object of the invention to identify optimal parameters of the estimation procedure which provide the proper accuracy of the estimates without the requirement of large amounts of data.

In accord with the above objects, the present invention provides methods, apparatus, and systems for mode assignment and mode adaptation to channel conditions which are based on estimations of real signal-to-noise ratios (SNR) for each frequency carrier bearing information. The invention utilizes two principal procedures: signal-to-noise ratio (SNR) estimation, and a corresponding mode assignment. According to the invention, SNR estimation is obtained by an averaging of squared Euclidean distances between received signals and reference signals corresponding to a sequence of received symbols, for each frequency carrier bearing random information. The methods and systems of the invention does not require special preamble or pilot signals for noise power estimation as they are based on noise power estimation during data transmission sessions and therefore can be used in pilotless wireless systems.

Several embodiments of the invention are provided. In a first embodiment of the invention, distances between normalized received signals from the output of a conventional frequency equalizer and reference signals (coordinates of constellation points) corresponding to current hard decisions from the output of a demodulator are squared, accumulated and averaged. If all hard decisions participating in that averaging are correct, the result of the procedure is an unbiased estimate of the noise power, and 50-symbol averaging is sufficient to provide 3% dispersion of the noise power estimate. However, if there are erroneous hard decisions, the result of the procedure is a biased estimate of the noise power, and the estimate bias depends on the bit error rate (BER). The bias does not exceed 4% at BER<$10^{-2}$.

According to the first embodiment of the invention, a SNR calculation is then based on normalized power of the utilized constellation and the noise power estimate. If the BER<$10^{-2}$ and the averaging interval is equal to at least 50 symbols, the SNR estimate is substantially accurate. The SNR estimation system according to the first embodiment of the invention is very simply implemented because squared Euclidean distances are typically calculated in an existing soft decision demodulator as a part of soft decision decoding function.

In a second embodiment of the invention, distances between normalized received signals from the output of a conventional frequency equalizer and reference signals (coordinates of constellation points) corresponding to decoded symbols from the output of a decoder are squared, accumulated and averaged and used for SNR estimation. The SNR estimation system of the second embodiment is more complex than the system of the first embodiment because in the second embodiment, the squared Euclidean distances calculated in the soft decision demodulator cannot be used, and a separate unit for computing squared distances is needed. In addition, the system of the second embodiment requires additional memory for delaying the received signals. However, the system, corresponding to the second embodiment of the invention, increases accuracy of the SNR estimates in the area of low channel quality where encoding can provide improvement of the performance.

According to the invention, the plurality of SNRs measured during the first step of the adaptation procedure are further used for the proper mode assignment. Usually a wireless system has a predetermined plurality of modes, and each mode meets a required performance when the SNR or some function thereof is not less than a certain threshold. So, the plurality of thresholds unambiguously correspond to the plurality of predetermined modes. Mode assignment according to the invention is therefore preferably accomplished by placing the plurality of thresholds in increasing order corresponding to the increasing bit rate of the modes, and selecting the mode which properly corresponds to the largest threshold which is less than the estimated SNR function.

According to another aspect of the invention, various SNR functions (channel quality functions) are provided depending upon the utilized system. For single carrier systems, the SNR function is simply the calculated SNR estimate. For multicarrier systems, the SNR function may be an average of carrier SNRs, a minimum carrier SNR (i.e., the SNR of the carrier having the worst SNR ratio is used for all carriers), or a SNR of a carrier whose SNR is the P'th (P being a predetermined number) highest or lowest SNR of the ordered plurality of SNRs.

Additional objects and advantages of the invention will become apparent to those skilled in the art upon reference to the detailed description taken in conjunction with the provided figures.

DETAILED DESCRIPTION OF THE PREFERRED EMBODIMENTS

The method, apparatus, and system of the invention broadly comprise equipment for and the procedure of estimating signal to noise ratios (SNRs), and equipment for and the procedure of assigning a transmission mode (i.e., a mode which defines a data transmission rate, modulation technique, and encoding rate) based on the SNR estimates. In the apparatus and system the "physical layer" of the receiver is responsible for SNR estimation, and the MAC layer is responsible for mode assignment.

Figure 1:
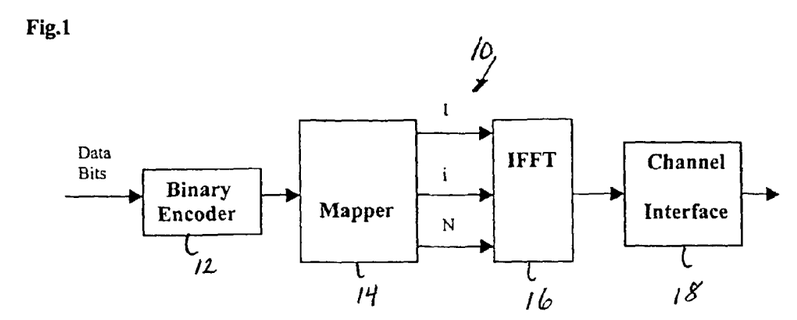
FIG. 1 is a high level block-diagram of a multicarrier OFDM transmitter.

The invention is most easily explained with reference to an orthogonal frequency division multiplex (OFDM) system, although those skilled in the art will appreciate that the invention may be used in other types of wireless systems including single carrier systems. Turning to FIG. 1, a transmitter 10 of an OFDM system is shown in block diagram format, with only those elements that are significant for the proposed method functionality indicated; i.e., all other elements which are unessential for this method such as timing, synchronization, interleaving, scrambling, bit-loading, prefix-inserting, filtering, HF modulation and demodulation, etc., are not shown. As seen in FIG. 1, data bits, reflecting any type of digitized information, are fed to the input of a binary encoder 12, which may be, for example, convolution encoder. The coded bits are then provided to a mapper 14 which combines the coded bits into binary combinations and maps them into PSK or QAM symbols. The mapper produces N complex numbers in parallel at its output, where N is the number of orthogonal carriers utilized in the system. These N numbers are fed to the parallel input of an inverse fast Fourier transform unit 16, which calculates and generates signal samples in the time domain. The stream of signal samples are then fed to a channel interface 18, which matches the transmitted signals with a channel. In the case of a wireless system, the channel interface 18 includes a D/A converter, a HF modulator, a power amplifier, and an antenna system (air interface).

Figure 2:
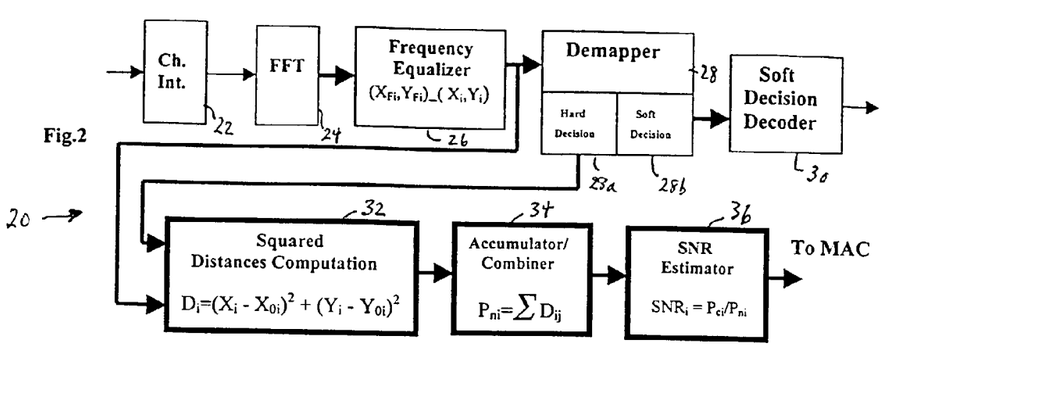
FIG. 2 is a high level block-diagram of a multicarrier OFDM receiver according to a first embodiment of the invention.

FIG. 2 shows a simplified block-diagram of a receiver 20 according to a first embodiment of the invention. The receiver 20 includes a channel interface 22, a fast Fourier transformer 24, a frequency equalizer 26, a demapper 28, a soft decision decoder 30, a squared distance computation means 32, an accumulator/combiner 34 and a SNR estimator 36. The channel interface 22 matches the incoming signal with a base-band processing unit. In the case of wireless system, the channel interface typically includes an antenna, a low-noise amplifier, a HF converter, filters, a demodulator, and other units unessential for consideration here.

The Fast Fourier Transform (FFT) 24, frequency equalizer 26, demapper 28, and soft decision decoder 30 are conventional parts of any OFDM system and are well known in the art. The FFT 24 calculates two numbers for each carrier; i.e., coordinates of the received signal point in two dimensional space, or real and imaginary parts of a complex number which reflect carrier phase and amplitude. So, in an N-carrier system the FFT block 24 calculates N pairs of numbers:

$$X_{Fi}, Y_{Fi}; i=1,2, \ldots, N. \tag{1}$$

The N pairs of numbers are fed to the frequency equalizer 26 which adjusts the numbers $X_{Fi}$, $Y_{Fi}$ in such a way that without noise the received signal is equal to one of the reference signals. This procedure includes amplitude adjustment and phase adjustment. As a result of the equalization procedure, the coordinates (1) are transformed into a new pair of coordinates:

$$X_i = X_{0i} + n_{xi},$$

$$Y_i = Y_{0i} + n_{yi}, \tag{2}$$

where $X_{0i}$ and $Y_{0i}$ are the coordinates of a constellation point (i.e., ideal points), transmitted on the i-th carrier, $n_{xi}$ and $n_{yi}$ are quadrature components of the noise on the i-th carrier, and i=1,2, . . . ,N.

The sets of numbers generated by the frequency equalizer 26 are fed to the demapper 28, which provides hard decision and/or soft decision functions 28a, 28b for each pair $X_i$, $Y_i$. The soft decisions are used in the soft decision decoder 30, which may be, for example, a Viterbi soft decision decoder which recovers the correct sequence of transmitted bits.

Typically, the soft decision procedure known in the art includes hard decision-making. In the demapper 28 of FIG. 2, the hard decision procedure 28a is shown separate from the soft decision procedure 28b because hard decisions are directly used in this embodiment of the invention. According to the invention, the hard decision for the i-th carrier defines a constellation point with coordinates $$X_{0i}, Y_{0i}; i=1,2, \ldots, N. \tag{3}$$

These coordinates are used as inputs to the squared distance computation unit 32 of the invention as set forth below. The squared distance computation unit 32, the accumulator/combiner 34, and the SNR estimator 34 are particular to the present invention because they provide SNR estimates needed for mode adaptation.

More particularly, the coordinates generated by the frequency equalizer 26 (see equation (2)) and the coordinates generated by the hard decision unit of the demapper 28 (see expression (3)) are provided to the distance computation unit which is adapted to calculate a set of squared Euclidean distances according to:

$$D_i = (X_i - X_{0i})^2 + (Y_i - Y_{0i})^2, \ i=1, 2, \ldots, N. \tag{4}$$

It should be noted that squared Euclidean distances according to equation (4) are usually calculated in the demapper 28 as a part of soft decision function 28b, and thus there may be no need for a special squared distances computation unit 32.

In any event, if the hard decision $X_{0i}$, $Y_{0i}$ is correct or if the i-th carrier is a pilot signal with a predetermined (not random) transmitted constellation point, then $D_i$ is an exact squared module (power) of the noise vector at the i-th carrier; i.e., $$D_i = (n_{xi})^2 + (n_{yi})^2, \ i=1,2, \ldots, N. \tag{5}$$

By accumulating in the accumulator/combiner 34 multiple power noise vectors $D_i$ over S consecutive symbols, the average noise power estimate $P_{ni}$ for the i-th carrier can be determined by:

$$P_{ni} = (1/S) * \left\{ \sum_{j=1}^{S} [(X_{ij} - X_{0ij})^2 + (Y_{ij} - Y_{0ij})^2] \right\}; \tag{6}$$

$$i = 1, 2, \ldots, N;$$

where index j corresponds to a symbol number. Equation (6) describes the simplest preferred version of an operating algorithm for the accumulator/combiner 34; although it will be appreciated by those skilled in the art that the average noise power estimate accumulation can be conducted with reference to only a single axis (i.e., either $(X_{ij}-X_{0ij})$ or $(Y_{ij}-Y_{0ij})$ can be taken as equal to zero in equation (6)). The algorithm provides estimation of noise power for each carrier. In combination with the i-th carrier power $P_{ci}$ which is a function of constellation used for the i-th carrier and which is known, it allows the SNR Estimator 36 to calculate signal-to-noise ratio for each carrier according to:

$$SNR_i = P_{ci}/P_{ni}. \tag{7}$$

Those skilled in the art should appreciate that in the preferred embodiment of the invention the carrier power $P_{ci}$ at the input of the demapper 28 is normalized due to frequency equalization, and this power is equal to predetermined average constellation power. For example, in a WLAN according to the IEEE.802.11a standard, a two-point QAM constellation (BPSK) has $P_{ci}=1$; a four-point QAM constellation (QPSK) has $P_{ci}=2$; a sixteen-point QAM constellation has $P_{ci}=10$; and a sixty-four-point QAM constellation has $P_{ci}=41.75$. So, the carrier power at the input of the demapper 28 does not depend on channel gain, including channel fading, but the channel gain is reflected in the noise power which cannot be equalized.

According to one aspect of the invention, the set of SNRs as determined by equation (7) contains all the necessary and sufficient information for mode adaptation. Thus, the SNRs are sent to the MAC layer (see FIG. 10) for final mode assignment.

The accuracy of the SNR estimates depends on both the observation interval and the channel quality. The observation interval, measured by a number of symbols, should be long enough to provide a proper averaging. However, when the channel quality is low, even extended averaging does not provide accurate estimates. Indeed, when some of the hard decisions in are erroneous, the resulting SNR estimate is biased in a decreasing direction, because the distance calculated by the squared distances computation unit 32 between the received signal and the incorrect point (as determined by the hard decision of the demapper 28) is necessarily less than the distance between the received signal and the correct point. Since the estimate of the noise power is definitely less than it really is, the bias may be mitigated by increasing the estimate. However, this increase must depend on the expected SNR level. A known method of bias mitigation is to remove some extreme components from averaging; i.e., the removal of several minimum and several maximum ("outlier") components.

Figure 3:
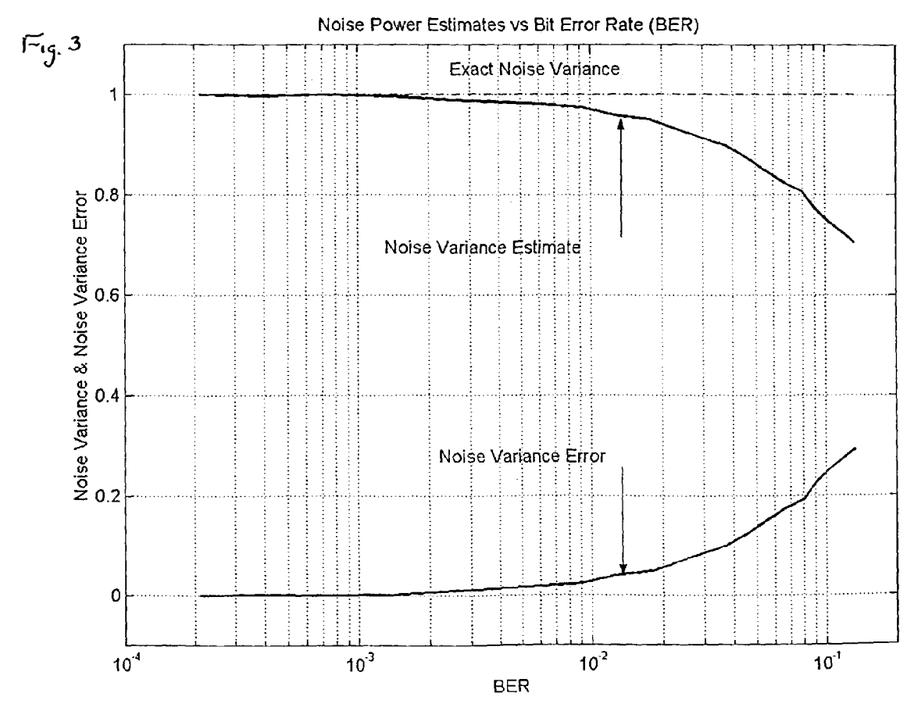
FIG. 3 is a plot of the noise power estimate as a function of bit error rate (BER) utilizing the receiver of the first embodiment of the invention.

Regardless of the method of bias mitigation, the problem of the accuracy of the SNR estimates at low channel quality exists. FIG. 3 shows the noise power estimate as a function of the bit error rate (BER). In the corresponding stochastic simulation, Gaussian noise with variance equal to "1" was added to the signal, and the signal level was changed to provide the proper BER. As can be seen from FIG. 3, the noise variance estimates are very close to the real noise variance and the noise variance error is close to zero if the BER<0.01. However, when the BER=0.1, the noise variance error exceeds 20%.

Figure 4:
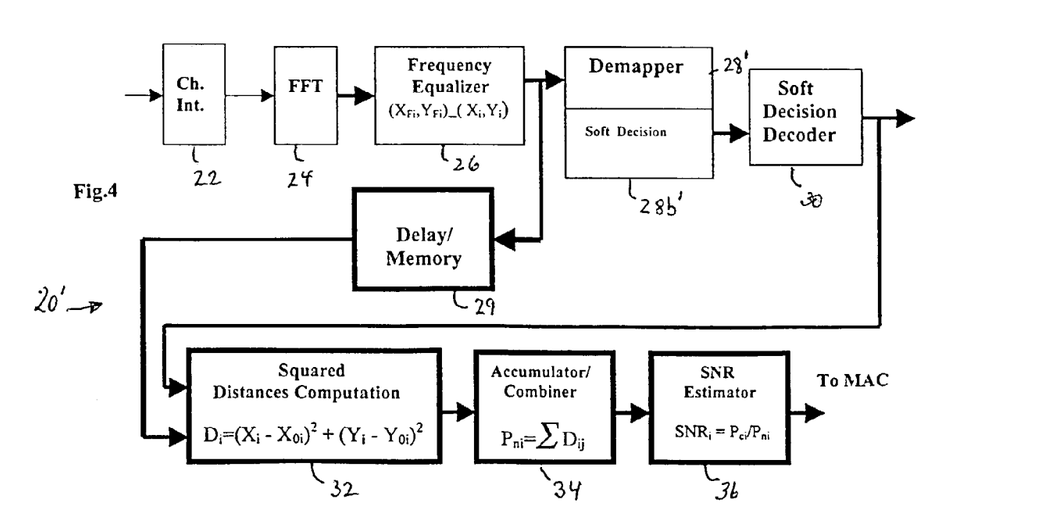
FIG. 4 is a block-diagram of a multicarrier OFDM receiver according to a second embodiment of the invention.

In order to reduce the error in the calculation of the SNR and to expand the BER area with accurate noise variance estimates, a second embodiment of the invention is provided in FIG. 4 which replaces the hard decisions utilized in the first embodiment with an algorithm which utilizes error corrected symbols.

Turning now to FIG. 4, a block diagram of the receiver 20' corresponding to the second embodiment is seen. Certain components such as the channel interface 22, fast Fourier transformer 24, frequency equalizer 26, soft decision decoder 30, squared distance computation unit 32, accumulator/combiner 34, and SNR estimator 36 are the same as in the receiver 20 in FIG. 2. However, the demapper 28' is provided only with a soft decision function 28b' (as opposed to a soft decision function and a hard decision function). In addition, the output of the frequency equalizer 26 is provided to a delay/memory 29, and the output of the delay/memory 29 (which provides a delayed sequence of frequency equalizer determinations) and the output of the soft decision decoder 30 (which provides a sequence of decisions $X_{Oi}$, $Y_{Oi}$) are provided as inputs to the squared distances computation unit 32. Because the decision of the soft decision decoder 30 is more accurate than the hard decision utilized in the first embodiment, the determination made by the squared distances computation unit 32 of FIG. 4 will be more accurate than its counterpart of FIG. 2. The "cost" of the more accurate determination is the delay which is introduced and must be accommodated by the delay/memory 29.

According to another aspect of the invention, it is desirable to make a determination of the averaging interval which necessary and sufficient for a correct estimation of the SNR. As is set forth below, a stochastic simulation shows that a mean of the noise power estimates (which estimates bias) depends on the symbol error rate in the channel and does not depend on the averaging interval, whereas the dispersion of noise power estimates depends on the averaging interval and does not depend on the symbol error rate.

Figure 5:
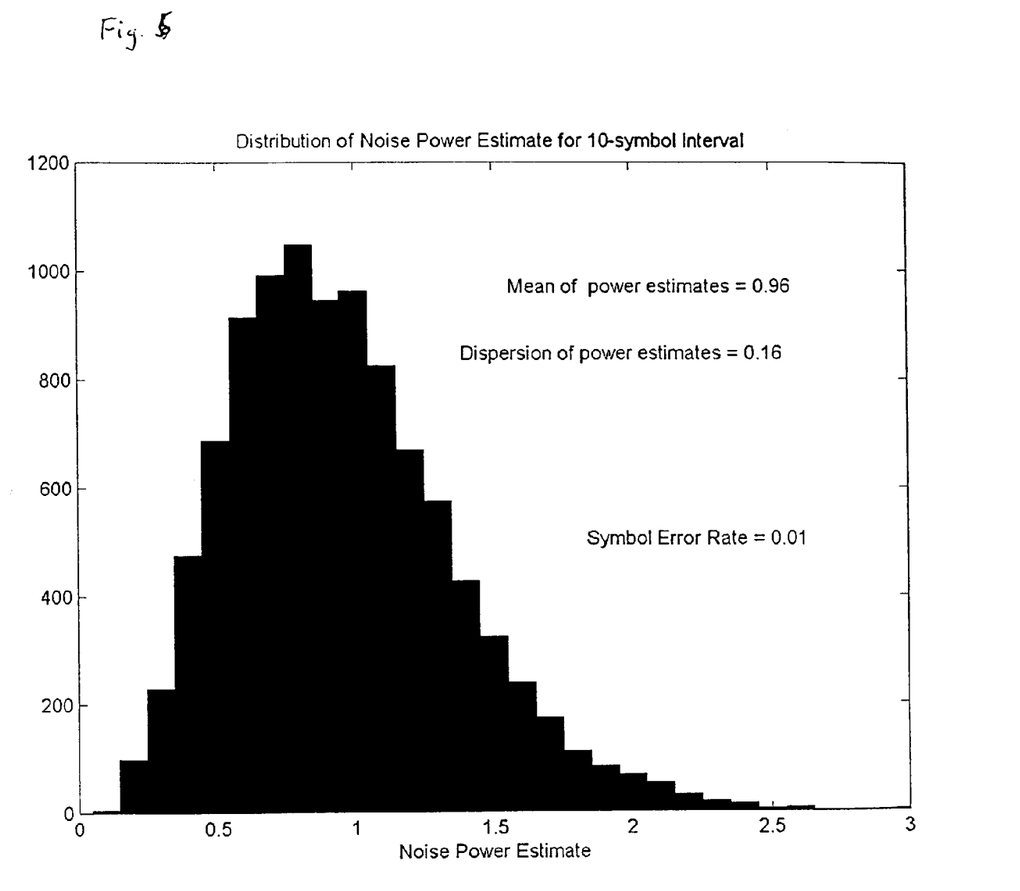
FIG. 5 a histogram showing the distribution of noise power estimates for 10-symbol averaging intervals at a symbol error rate of $10^{-2}$.
Figure 6:
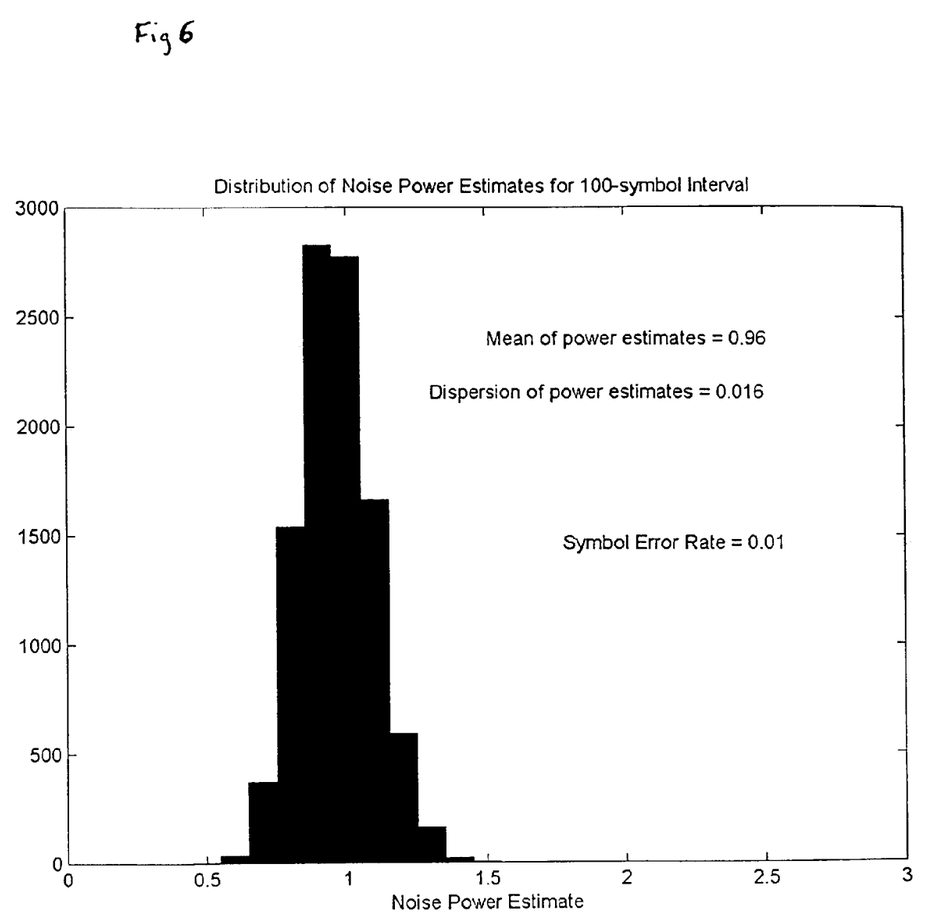
FIG. 6 is a histogram showing the distribution of noise power estimates for 100-symbol averaging intervals at a symbol error rate $10^{-2}$.
Figure 7:
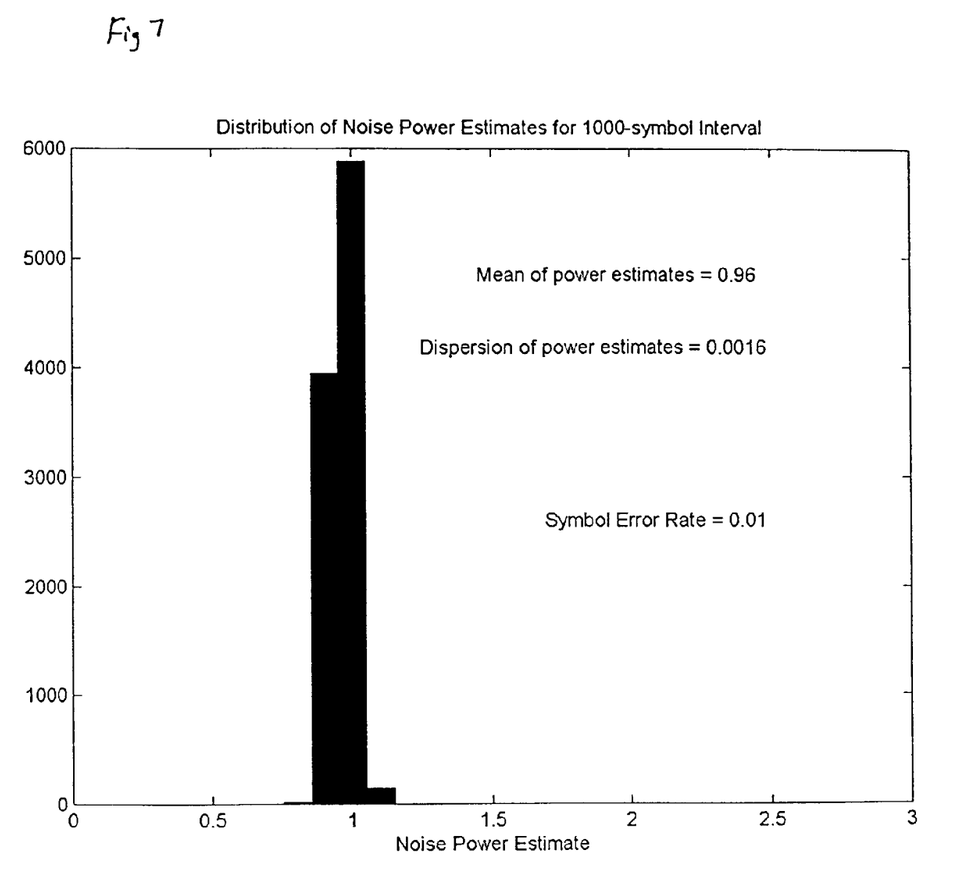
FIG. 7 is a histogram showing the distribution of noise power estimates for 1000-symbols averaging intervals at a symbol error rate $10^{-2}$.

FIGS. 5–7 show the distribution of noise power estimates for averaging intervals of 10, 100 and 1000 symbols, respectively. All stochastic simulations were provided at a symbol error rate of $10^{-2}$. As can be seen from FIGS. 5–7, the mean of the power estimates (mean=0.96) does not depend on the averaging interval (i.e., it is constant over the three averaging intervals), and the estimate bias is equal 4%. On the other hand, the dispersion of power estimates changes from 16% for the ten-symbol interval to 0.16% for the one thousand-symbol interval.

Figure 8:
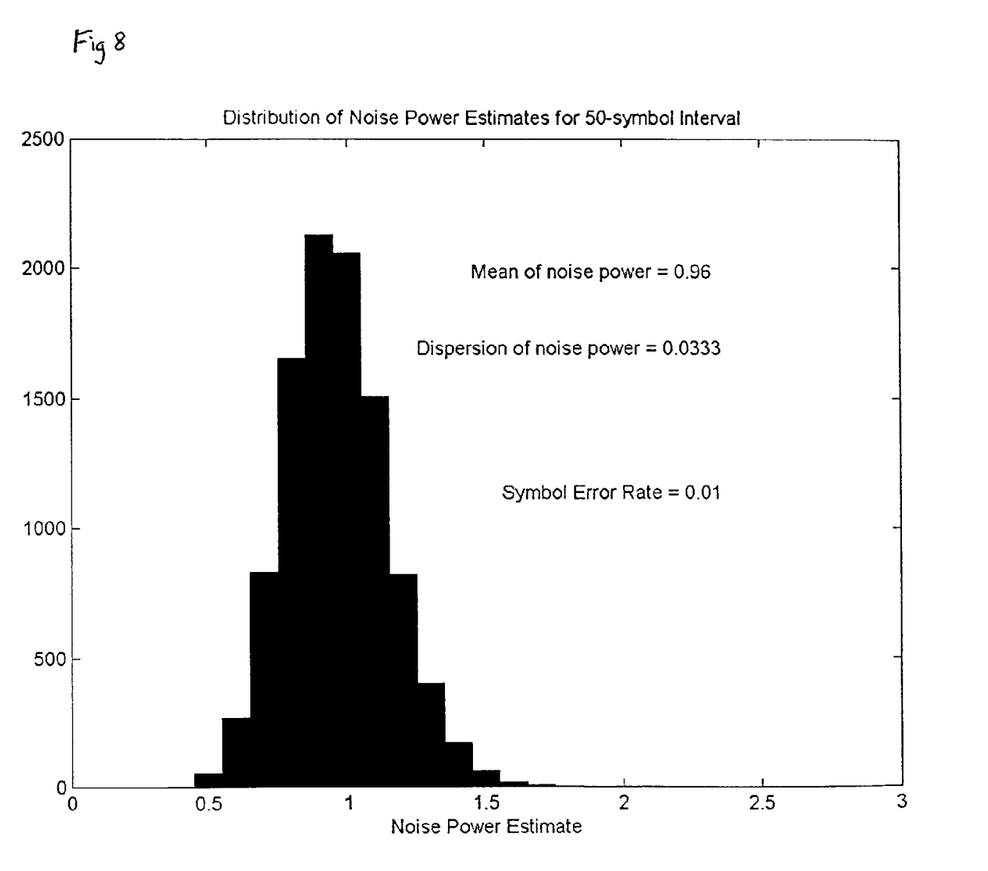
FIG. 8 is a histogram showing the distribution of noise power estimates for 50-symbols averaging intervals at a symbol error rate $10^{-2}$.

For many applications, a 3%-dispersion of noise power estimates is deemed acceptable. As seen in FIG. 8, this level of accuracy is substantially achieved with a fifty-symbol averaging interval. This suggests that in the IEEE802.11a standard for a WLAN system which contains fifty-two carriers, an estimation of the average SNR is possible within one symbol interval by means of averaging in the frequency domain instead of averaging in the time domain.

As previously mentioned, according to the invention, the SNR estimates are obtained for purposes of conducting a mode assignment. As a rule, wireless systems have a predetermined plurality of modes, and each mode requires certain performance based on certain thresholds which relate to the SNR or some function thereof. Stated another way, the plurality of thresholds unambiguously correspond to the plurality of predetermined modes. The proposed general approach to the mode assignment can be described as follows.

First, thresholds from the above-mentioned plurality of thresholds are placed in increasing order corresponding to the increasing data rate of the modes:

$$L=\{L_1, L_2, \ldots, L_k, \ldots L_M\}, \qquad (8)$$

where L is an ordered set of thresholds ($L_k<L_{k+1}$) corresponding to the plurality of system modes placed in the increasing data rate order, k is the mode number (k=1, 2, ..., M), and M is the number of modes. Then, the proper mode is chosen by selecting the mode which corresponds to the maximum threshold from set L which is less than the estimated channel quality function.

This general algorithm can be presented mathematically. Let F(SN) be a channel quality function, depending on plurality of SNRs from equation (7) above where the vector SN=$\{SNR_1, SNR_2, \ldots, SNR_i, \ldots, SNR_N\}$. Then, the algorithm of mode assignment can be presented as follows:

$$\text{Mode\_Max}[L \leq F(SN)]. \qquad (9)$$

As will be discussed hereinafter, according to the preferred embodiment of the invention, it is the responsibility of the MAC layer (Media Access Control) to assign the proper mode assignment according to algorithm (9).

The mode assignment is easily understood with reference to a simple example of a single carrier system with QAM modulation in an AWGN channel. Assume, for example, that the system has M=4 modes with number of constellation points 2, 4, 16 and 64, and that the required BER$\leq 10^{-5}$. This performance level requires about 9.5 dB of SNR for 2-QAM, 12.5 dB for 4-QAM, 18.5 dB for 16-QAM and 24.5 dB for 64-QAM. So, the ordered set of thresholds L in this case is L={9.5, 12.5, 18.5, 24.5}. In the considered single carrier case, the channel quality function F(SN) is simply the estimate of the signal-to-noise ratio on the carrier;

F(SN)=SNR. Thus, if for example, the signal-to-noise estimate is SNR=20 dB, then Max[L≦F(SN)]=18.5, and mode 3 with the sixteen-point constellation should be assigned. Likewise, if SNR=17.2 dB, then Max[L≦F(SN)]=12.5 and mode 2 with the four-point constellation should be assigned.

According to another aspect of the invention, various channel quality functions F(SN), which depend on a plurality of signal-to-noise ratios $SN=\{SNR_1, SNR_2, \ldots, SNR_i, \ldots, SNR_N\}$ are provided. As set forth above, for single carrier systems the channel quality function F(SN) is simply the SNR estimate of equation (7) calculated at the first step of the mode adaptation procedure; i.e., F(SN)= SNR. Thus, for single carrier systems, the ordered set of thresholds L (general algorithm (9)), corresponding to the plurality of system modes in the increasing data rate order is determined by means of known theoretical equations, describing performance as a function of signal-to-noise ratio. For example, as set forth in J. Proakis, *Digital Communications*, 4-th edition, McGraw-Hill, 2001, Sections 5.2.9, 14.5, the symbol error probability $P_m$ for an m-ary QAM system ($m=2^k$, and k is even integer) in the AWGN channel is equal to $$P_m(SNR) = 2(1-1/\sqrt{m}) * Q\{[3*SNR/(m-1)]^{1/2}\}, \quad (10)$$

where the SNR is the average signal-to-noise ratio per symbol, and $$Q\{x\} = (1/2\pi)^{1/2} \int_x^\infty \exp(-x^2/2) dx. \quad (11)$$

Assigning the desired symbol error rate P to Pm in the left part of equation (10) and allowable "m" (modes) in the right part of equation (10), a set of corresponding SNRs can be found from the equation which provide $P_m(SNR)=P$. This set completely determines the ordered set of thresholds L (general algorithm (9)) corresponding to the plurality of system modes in the increasing data rate order.

Another way to find the ordered set of thresholds L is a preliminary simulation of the system for the expected channel models. In this way each mode is simulated with a predetermined channel model. For example, with an AWGN (additive white Gaussian noise) channel and carriers subjected to log-normal uncorrelated fading, the goal of the simulation is to determine a set of thresholds L corresponding to the required performances for each of the system modes.

In the case of multicarrier systems, different methods of adapting to channel conditions are available, including an all-carrier powers adjustment and a non-uniform powers adjustment to desired carriers (i.e., optimal power loading). The SNR estimation of the invention allows the system to provide the optimal (non-uniform) distribution of power among the carriers because the method provides a full set of carrier SNRs. In this scenario the existing algorithms of optimal power loading may be used. See, L. Goldfeld, V. Lyandres, D. Wulich, "Minimum BER Power Loading for OFDM in Fading Channel", *IEEE Transactions on Communications*, Vol. 50, N11, 2002. However, this approach is efficient primarily in situations where there is very slow fading and a very fast feedback channel. In addition, wireless standards, as a rule, do not allow the system to use non-uniform power loading or non-identical constellations for different carriers.

Therefore, for multicarrier systems such as an OFDM system according to the IEEE802.11a standard, an all-carrier power adjustment is preferred, and the channel quality function F(SN) is preferably an integral (aggregative) estimate, based on the SNR vector $SN=\{SNR_1, SNR_2, \ldots, SNR_i, \ldots, SNR_N\}$. As set forth below, the estimate may take any of various forms including an average of carrier SNRs, a minimum carrier SNR (i.e., the SNR of the carrier having the worst SNR ratio is used for all carriers), or a SNR of a carrier whose SNR is the P'th (P being a predetermined number) highest or lowest SNR of the ordered plurality of SNRs.

The average of carrier SNRs is readily obtained by the SNR estimators 36 of the receivers of FIG. 2 and FIG. 4, or can be obtained by the MAC discussed below with reference to FIG. 10. For OFDM systems with an equal number of constellation points for all carriers, the average signal-to-noise ratio $SNR_{av}$ is $$SNR_{av} = (1/N) \sum_{i=1}^{N} P_c / P_{ni}, \quad (12)$$

or in the explicit form:

$$SNR_{av} = (S/N) \sum_{i=1}^{N} P_c / \left[ \sum_{j=1}^{S} (X_{ij} - X_{0ij})^2 + (Y_{ij} - Y_{0ij})^2 \right], \quad (13)$$

where $P_c$ is the normalized average constellation power, $P_{ni}$ is the noise power estimates for the i'th carrier according to equation (6), N is the number of active carriers, and S is the number of symbols within the averaging interval.

As is seen from equation (13), N carriers and S symbols in each carrier participate in the computation. The numbers N and S may be modified depending on channel stochastic properties. For example, if fading is nonselective and noise is white, then averaging in the time domain and averaging in the frequency domain provide the same results (ergodic process). Therefore, in this particular case, N may be decreased by increasing S and vice versa, having left unchanged their sum N+S, i.e., the total number of averaged components sufficient for accurate estimation. In certain cases where N is large enough, only one symbol is required for each carrier (S=1):

$$SNR_{av} = (1/N) \sum_{i=1}^{N} P_c / [(X_i - X_{0i})^2 + (Y_i - Y_{0i})^2]. \quad (14)$$

For example, in the implementation of an OFDM WLAN (IEEE802.11a standard) having N=52, the SNR can be estimated with 3% dispersion during one symbol. So, in this case the channel quality function is equal to $$F(SN) = SNR_{av}, \quad (15)$$

where $SNR_{av}$ is determined by any of equations (12), (13) or (14).

For this case the ordered set of thresholds L (general algorithm (9)), corresponding to the plurality of system modes in the increasing data rate order is determined by means of known theoretical equations, representing system performance as a function of average signal-to-noise ratio.

See, J. Proakis, "Digital Communications", 4-th edition, McGraw-Hill, 2001, Sections 5.2.9, 14.5. As a rule, the corresponding equations for multicarrier fading channel with multiposition modulation are comparatively complex for analytical consideration; see for example, formula (14.4–38) in Proakis. Therefore for systems with multicarrier and multiposition modulation as well as with error correcting coding, the best way to find the ordered set of thresholds L is a preliminary simulation of the system for the expected channel models.

As previously suggested, instead of an average of carrier SNR technique, a minimum carrier SNR technique can be used by the system. The minimum carrier SNR technique is the most simple channel quality function for multicarrier wireless systems and can be implemented either in the PHY utilizing the SNR estimators 36 in the receivers of FIG. 2 and FIG. 4 or in the MAC as discussed below with reference to FIG. 10. In the minimum carrier SNR technique, the channel quality function is $$F(SN)=\min(SNR_1, SNR_2, \ldots, SNR_i, \ldots, SNR_N)=SNR_{min}, \quad (16)$$

and the ordered set of thresholds L (general algorithm (9)) corresponding to the plurality of system modes placed in the increasing data rate order is determined in the same way as in the case of the single carrier system. The minimum carrier SNR technique provides an underestimated bit rate; but, on the other hand, it guarantees the required performance.

As also previously indicated, a third SNR technique according to the invention is a SNR-with-predetermined-index technique. In this technique, the SNRs from the set $SN=(SNR_1, SNR_2, \ldots, SNR_i, \ldots, SNR_N)$ are placed in increasing order and renumbered as follows:

$$SN_r=(SNR_{r1}, SNR_{r2}, \ldots, SNR_{ri}, \ldots, SNR_{rN}),$$
$$SNR_{ri} \leq SNR_{r(i+1)}, \quad (17)$$

where index "r" shows that it is a reordered set of SNRs. In this case the quality function is $$F(SN)=SNR_{rP}, \quad (18)$$

where P is some predetermined index, and 1<P<N.

Utilization of the quality function (18) may be explained as follows. If the system uses forward error correction (FEC), it will correct a certain number of erroneous symbols. For example, assume that the system can correct (P−1) symbols transmitted by means of (P−1) carriers. This means that the system performance practically does not depend on SNRs for the (P−1) weakest carrier. SNRs for those weakest carriers may be close to zero, but FEC will correct their erroneous symbols if the remaining carriers have sufficiently high SNRs. So, the system should use the mode which provides the maximum bit rate with the required performance at a SNR corresponding to the P-th carrier in the renumbered set (17).

Figure 9:
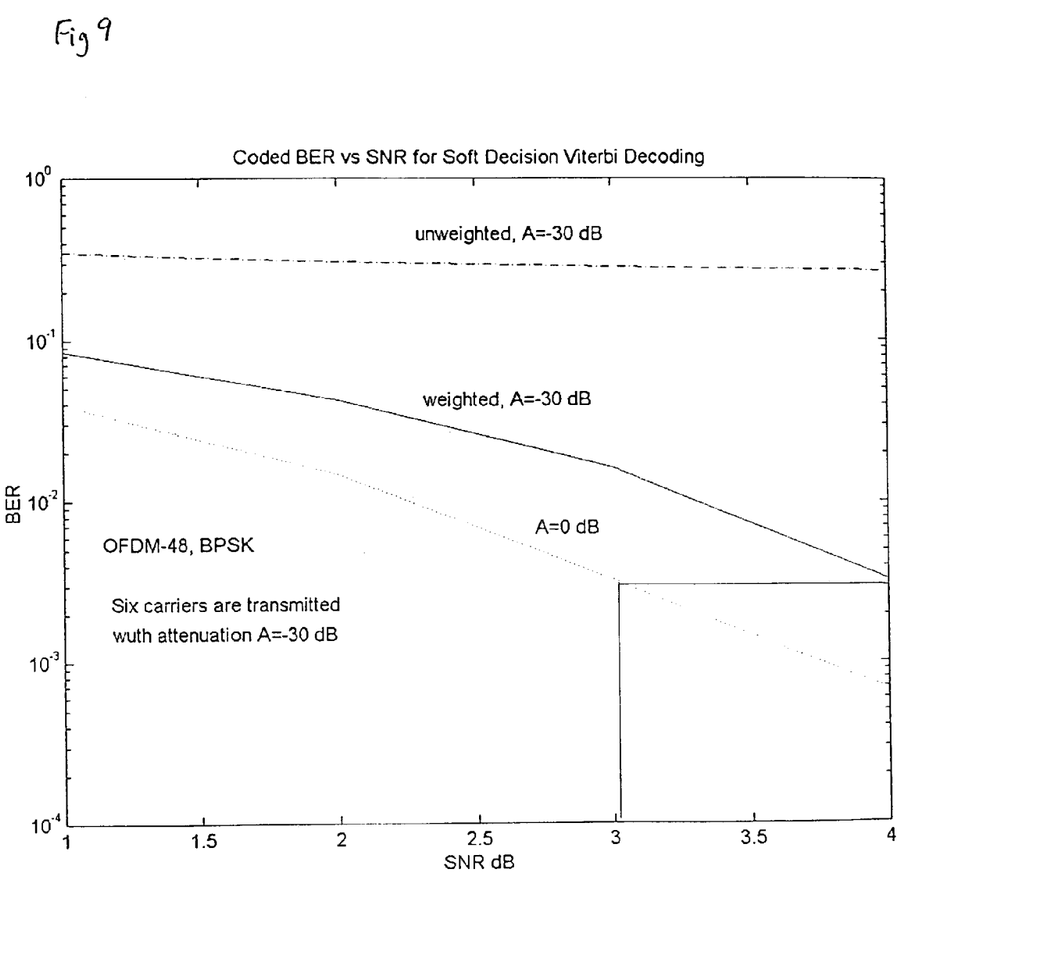
FIG. 9 is a graph which shows the bit error rate as a function of SNR for a WLAN 48-carrier system with BPSK modulation and Viterbi soft decision decoding when six carrier are completely suppressed.

The SNR-with-predetermined-index technique can be illustrated by way of example of a WLAN according to IEEE802.11a standard. The IEEE802.11a system uses forty-eight carriers and a convolution code with Viterbi soft decision decoding. FIG. 9 shows the results of a stochastic simulation of the system using BPSK modulation and ½ redundant convolution code. In the simulation, forty-two carriers were transmitted with a SNR as indicated in the abscissa axis, and six carriers were transmitted with additional attenuation of either 0 dB (i.e. without attenuation) or −30 dB (i.e. practically completely suppressed). In spite of the fact that six carriers were completely suppressed, the weighted soft decision decoding provides comparatively high performance, and energy loss does not exceed 1 dB. If this loss is acceptable, the SNR of the seventh carrier from set (17) can be used as the channel quality function for mode assignment; i.e., in this case $F(SN)=SNR_{r7}$.

Figure 10:
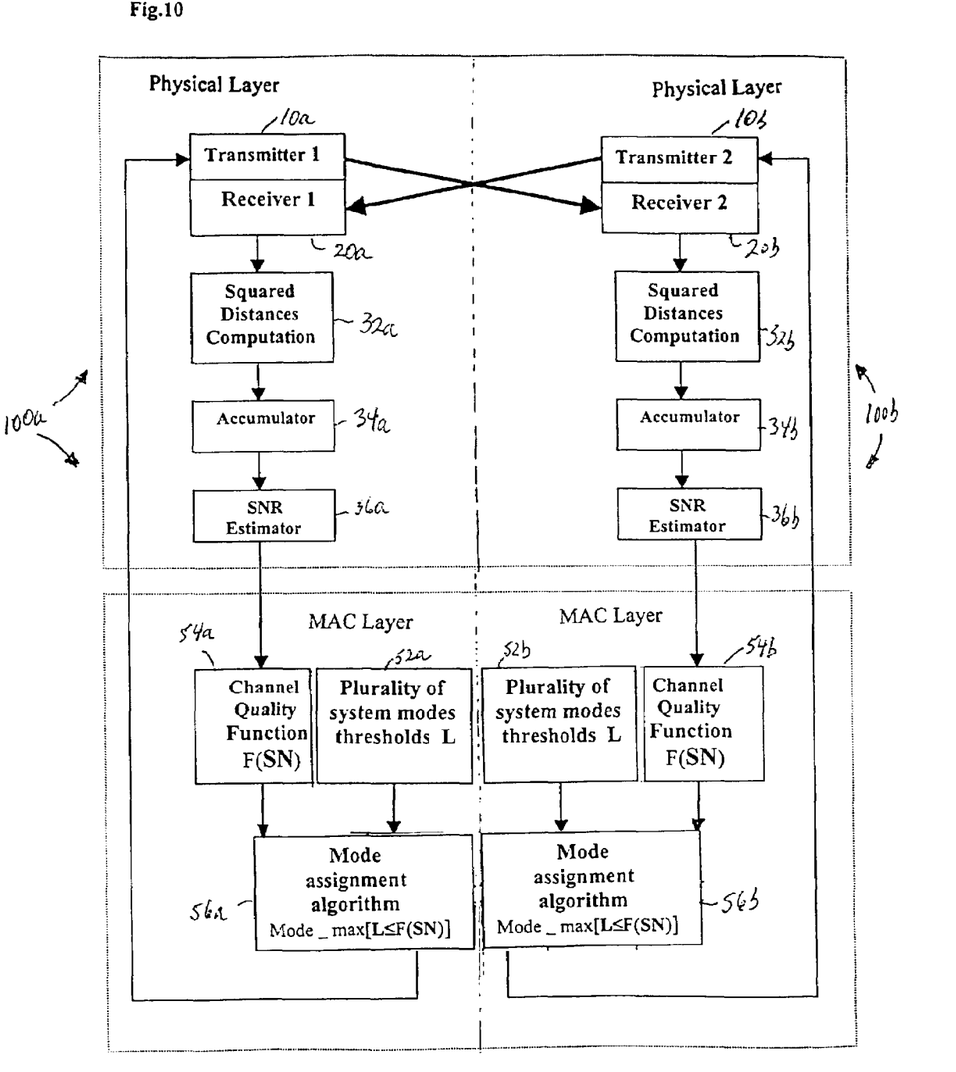
FIG. 10 is a block diagram illustrating a mode assignment procedure according to the invention.

Turning now to FIG. 10, the method, apparatus, and system of mode assignment and adaptation to channel conditions is shown in block diagram format. In particular, first and second transceivers 100a, 100b are shown to each include a physical layer 101 and a MAC layer. 102. The physical layer of each device includes a transmitter 10a, 10b, and a receiver 20a, 20b. As an example, the transmitter 10a and receiver 20b may be a part of user mobile terminal, and transmitter 10b and receiver 20b may be a part of access point terminal. In the preferred embodiment of the system, each receiver 20a, 20b contains blocks for SNR estimation including a squared distances computation block 32a, 32b, an accumulator 34a, 34b, and a SNR estimator 36a, 36b. The MAC layer of each transceiver contains several blocks including memory 52a, 52b which stores a plurality of system modes thresholds L, a channel quality function block 54a, 54b which calculates F(SN), and a mode assignment block 56a, 56b which utilizes the channel quality function provided by the channel quality function block and the thresholds available from the threshold memory in order to determine what mode is to be utilized.

According to the method of the invention, the mode assignment procedure can be described as follows. Transmitter 10a transmits a signal, and receiver 20b receives the signal, calculates squared distances in block 32b according to equation (4), averages the distances in block 34b according to equation (6), and calculates a set of SNRs in block 36b according to equation (7). The set of SNRs is fed to the MAC where channel quality function is calculated by block 54b. The optimal mode is then determined by block 56b according to equation (9) and using any of the above-described techniques (average carrier SNR, minimum carrier SNR, or SNR-with-predetermined-index), or any other desirable technique. Finally, the MAC informs the physical layer (i.e., the determination of the mode assignment block 56b is fed back to the transmitter 10b) about the assigned mode in the direction from transceiver 100a to transceiver 100b. That information is then transmitted from transceiver 100b to transceiver 100a (i.e., from transmitter 10b to receiver 20a) preferably within a portion of a preamble of a message.

In a duplex transmission system, the same procedure is carried out in the direction from transceiver 100b to transceiver 100a, with transmitter 10b sending a signal which is received by receiver 20b. After calculating SNRs and determining a mode assignment, the assigned mode is fed back to transmitter 10a for transmission preferably in a portion of a preamble of a message to receiver 20b.

It will be appreciated by those skilled in the art that the physical and MAC layers of the apparatus of the invention can be implemented in many different ways, including hardware, firmware, software, or a combination of two or more thereof. Generally, the physical layer includes at least some element of hardware, while the MAC layer is often implemented in software.

There have been described and illustrated methods, apparatus and systems for mode adaptation in wireless systems. While particular embodiments of the invention have been described, it is not intended that the invention be limited thereto, as it is intended that the invention be as broad in scope as the art will allow and that the specification be read likewise. Thus, while receivers having particular elements have been disclosed, it will be appreciated that other receivers could be utilized provided that sufficient information may be generated in order to conduct squared distance computations. Also, while the invention was described with particular reference to the IEEE 802.11a standard, it will be appreciated that the invention is useful in any wireless telecommunications system utilizing single carrier or multicarrier data transmission with multiple transmission modes. Further, while particular mode assignment algorithms were described, it will be appreciated that other mode assignment algorithms could be utilized. It will therefore be appreciated by those skilled in the art that yet other modifications could be made to the provided invention without deviating from its spirit and scope as claimed.

We claim:

1. A method for mode assigmnent in a wireless telecommunications system, comprising:
   a) receiving multicarrier wireless telecommunications signals;
   b) measuring an indication of a signal-to-noise ratio (SNR) of the received signals by conducting a squared Euclidian distance computation between an amplitude adjusted and phase adjusted equalized signal of each received signal and a corresponding ideal signal according to $D_i=(X_i-X_{0i})^2+(Y_i-Y_{0i})^2$, $i=1, 2, \ldots, N$, where i is a carrier index, $D_i$ is a squared Euclidian distance, $X_{0i}$ and $Y_{0i}$ are coordinates of said ideal point, and $X_i$ and $Y_i$ are coordinates of said equalized signal; and
   c) utilizing said SNR, determining a mode assignment for said system.

2. A method according to claim 1, wherein:
said ideal signal is obtained from a hard decision generated by a decision means.

3. A method according to claim 1, wherein:
said ideal signal is obtained from a soft decision generated by a decision means.

4. A method according to claim 1, wherein:
said measuring an indication of a SNR comprises averaging $D_i$ through a plurality of signals to find an average noise power estimate for an i-th carrier of said multicarrier signal and dividing a known i-th carrier power by said average noise power estimate for an i-th carrier to provide said indication of a SNR.

5. A method according to claim 4, wherein:
said averaging finds an average noise power estimate for each carrier of said multicarrier signal, and known carrier powers for each carrier is divided by said average noise power estimate for that carrier to provide a plurality of SNR indications.

6. A method according to claim 1, wherein:
said determining a mode assignment comprises corresponding a plurality of thresholds L of a channel quality function to a plurality of telecommunication transmission modes, said channel quality function being a function of a SNR indication (F(SN)), and choosing a mode according to a relationship between F(SN) and L.

7. A method according to claim 6, wherein:
said relationship between F(SN) and L is Mode_Max [L≦F(SN)] where said plurality of thresholds L are ordered in increasing order and said Mode_Max is a mode which corresponds to a maximum function.

8. A method according to claim 7, wherein:
said telecommunications signals are on a single carrier and said function F(SN)=SNR.

9. A method according to claim 5, wherein:
said determining a mode assignment comprises corresponding a plurality of thresholds L of a channel quality function to a plurality of telecommunication transmission modes, said channel quality function being a function of SNR indications (F(SN)), and choosing a mode according to a relationship between F(SN) and L.

10. A method according to claim 9, wherein:
said relationship between F(SN) and L is Mode_Max [L≦F(SN)] where said plurality of thresholds L are ordered in increasing order and said Mode_Max is a mode which corresponds to a maximum function.

11. A method according to claim 10, wherein:
said F(SN) is an average of said SNR indications for a plurality (N) of carriers of said multicarrier signal.

12. A method according to claim 11, wherein:
said average of said SNR indications ($SNR_{av}$) is determined by $$SNR_{av} = (S/N) \sum_{i=1}^{N} P_c \bigg/ \left[ \sum_{j=1}^{S} (X_{ij} - X_{0ij})^2 + (Y_{ij} - Y_{0ij})^2 \right],$$

where $P_c$ is a normalized average constellation power and S is the number of symbols within an averaging interval.

13. A method according to claim 10, wherein:
said F(SN) is a minimum SNR value for said carriers of said multicarrier signal.

14. A method according to claim 10, wherein:
said F(SN) is a SNR value chosen from a predetermined index of a SNR values.

15. A method according to claim 14, wherein:
said SNR values for a plurality (N) of carriers of said multicarrier signal are placed in value order and $F(SN)=SNR_{r,P}$, where r indicates that said carriers are in value order, P is a predetermined index, and 1<P<N.

16. A method according to claim 1, where said telecommunications system includes a first apparatus which generates signals which are received by a second apparatus according to said receiving, and said second apparatus conducts said measuring, said utilizing and said determining, said method further comprising:
   d) transmitting said mode assignment from said second apparatus to said first apparatus.

17. An apparatus for determining a mode assignment in a wireless telecommunications system, comprising:
   a) means for receiving multicarrier wireless telecommunications signals;
   b) means for measuring an indication of a signal-to-noise ratio (SNR) of the received signals by conducting a squared Euclidian distance computation between an amplitude adjusted and phase adjusted equalized signal of each received signal and a corresponding ideal signal according to $D_i=(X_i-X_{0i})^2+(Y_i-Y_{0i})^2$, $i=1, 2, \ldots, N$, where i is a carrier index, $D_i$ is a squared Euclidian distance, $X_{0i}$ and $Y_{0i}$ are coordinates of said ideal point, and $X_i$ and $Y_i$ are coordinates of said equalized signal;
   c) means for utilizing said SNR to determine a mode assignment for said system.

18. An apparatus according to claim 17, wherein:
said means for generating an ideal point comprises a hard decision generator.

19. An apparatus according to claim 17, wherein:
said means for generating an ideal point comprises a soft decision decoder.

20. An apparatus according to claim 17, wherein:
said means for generating an ideal point comprises a soft decision decoder, and said means for measuring an indication includes memory coupled between said equalizer and said means for conducting a squared Euclidian distance.

21. An apparatus according to claim 17, wherein:
said means for measuring an indication of a SNR comprises means for averaging $D_i$ through a plurality of signals to find an average noise power estimate for an i-th carrier of said multicarrier signal and dividing a known i-th carrier power by said average noise power estimate for an i-th carrier to provide said indication of a SNR.

22. An apparatus according to claim 21, wherein:
said means for averaging finds an average noise power estimate for each carrier of said multicarrier signal, and known carrier powers for each carrier are divided by said average noise power estimate for that carrier to provide a plurality of SNR indications.

23. An apparatus according to claim 17, wherein:
said means for utilizing said SNR to determine a mode assignment comprises means for choosing a mode according to a relationship between F(SN) and L, where F(SN) is a function of a SNR indication, and L is a vector of plurality of thresholds which relate a channel quality function to a plurality of telecommunication transmission modes.

24. An apparatus according to claim 23, wherein:
said relationship between F(SN) and L is Mode_Max [L≦F(SN)] where said vector L is ordered in increasing order and said Mode_Max is a mode which corresponds to a maximum function.

25. An apparatus according to claim 24, wherein:
said telecommunications signals are on a single carrier and said function F(SN)=SNR.

26. An apparatus according to claim 22, wherein:
said means for utilizing said SNR to determine a mode assignment comprises means for choosing a mode according to a relationship between F(SN) and L, where F(SN) is a function of a SNR indication, and L is a vector of plurality of thresholds which relate a channel quality function to a plurality of telecommunication transmission modes.

27. An apparatus according to claim 26, wherein:
said relationship between F(SN) and L is Mode_Max [L≦F(SN)] where said vector L is ordered in increasing order and said Mode_Max is a mode which corresponds to a maximum function.

28. An apparatus according to claim 27, wherein:
said F(SN) is an average of said SNR indications for a plurality (N) of carriers of said multicarrier signal.

29. An apparatus according to claim 28, wherein:
said average of said SNR indications ($SNR_{av}$) is determined by $$SNR_{av} = (S/N) \sum_{i=1}^{N} P_c \bigg/ \left[ \sum_{j=1}^{S} (X_{ij} - X_{0ij})^2 + (Y_{ij} - Y_{0ij})^2 \right],$$

where $P_c$ is a normalized average constellation power and S is the number of symbols within an averaging interval.

30. An apparatus according to claim 27, wherein:
said F(SN) is a minimum SNR value for said carriers of said multicarrier signal.

31. An apparatus according to claim 27, wherein:
said F(SN) is a SNR value chosen from a predetermined index of a SNR values.

32. An apparatus according to claim 31, wherein:
said SNR values for a plurality (N) of carriers of said multicarrier signal are in value order and $F(SN)=SNR_{rP}$, where r indicates that said carriers are in value order, P is a predetermined index, and 1<P<N.

33. A telecommunications system, comprising:
a) a first telecommunications apparatus having a first transmitter which transmits first multicarrier wireless telecommunications signals and a first receiver;
b) a second telecommunications apparatus having a second receiver which receives said first telecommunications signals, means for measuring an indication of a signal-to-noise ratio (SNR) of the received first telecommunications signals by conducting a squared Euclidian distance computation between an amplitude adjusted and phase adjusted equalized signal of each received signal and a corresponding ideal signal according to $D_i=(X_i-X_{0i})^2+(Y_i-Y_{0i})^2$, i=1, 2, . . . , N, where i is a carrier index, $D_i$ is a squared Euclidian distance, $X_{0i}$ and $Y_{0i}$ are coordinates of said ideal point, and $X_i$ and $Y_i$ are coordinates of said equalized signal, means for utilizing said SNR to determine a mode assignment for said system, and a second transmitter which transmits said mode assignment as a second telecommunications signal for receipt by said first receiver of said first telecommunications apparatus.

34. A system according to claim 33, wherein:
said means for generating an ideal point comprises a hard decision generator.

35. A system according to claim 33, wherein:
said means for generating an ideal point comprises a soft decision decoder.

36. A system according to claim 33, wherein:
said means for generating an ideal point comprises a soft decision decoder, and said means for measuring an indication includes memory coupled between said equalizer and said means for conducting a squared Euclidian distance.

37. A system according to claim 33, wherein:
said means for measuring an indication of a SNR comprises means for averaging $D_i$ through a plurality of signals to find an average noise power estimate for an i-th carrier of said multicarrier signal and dividing a known i-th carrier power by said average noise power estimate for an i-th carrier to provide said indication of a SNR.

38. A system according to claim 37, wherein:
said means for averaging finds an average noise power estimate for each carrier of said multicarrier signal, and known carrier powers for each carrier are divided by said average noise power estimate for that carrier to provide a plurality of SNR indications.

39. A system according to claim 33, wherein:
said means for utilizing said SNR to determine a mode assignment comprises means for choosing a mode according to a relationship between F(SN) and L, where F(SN) is a function of a SNR indication, and L is a vector of plurality of thresholds which relate a channel quality function to a plurality of telecommunication transmission modes.

40. A system according to claim 39, wherein:
said relationship between F(SN) and L is Mode_Max [L≦F(SN)] where said vector L is ordered in increasing order and said Mode_Max is a mode which corresponds to a maximum function.

41. A system according to claim 40, wherein:

said first wireless telecommunications signals are on a single carrier and said function F(SN)=SNR.

42. A system according to claim 38, wherein:

said means for utilizing said SNR to determine a mode assignment comprises means for choosing a mode according to a relationship between F(SN) and L, where F(SN) is a function of a SNR indication, and L is a vector of plurality of thresholds which relate a channel quality function to a plurality of telecommunication transmission modes.

43. A system according to claim 42, wherein:

said relationship between F(SN) and L is Mode_Max [L≦F(SN)] where said vector L is ordered in increasing order and said Mode_Max is a mode which corresponds to a maximum function.

44. A system according to claim 43, wherein:

said F(SN) is an average of said SNR indications for a plurality (N) of carriers of said multicarrier signal.

45. A system according to claim 44, wherein:

said average of said SNR indications ($SNR_{av}$) is determined by $$SNR_{av} = (S/N) \sum_{i=1}^{N} P_c \bigg/ \left[ \sum_{j=1}^{S} (X_{ij} - X_{0ij})^2 + (Y_{ij} - Y_{0ij})^2 \right],$$

where $P_c$ is a normalized average constellation power and S is the number of symbols within an averaging interval.

46. A system according to claim 45, wherein:

a sum of S and N is between 10 and 1000.

47. A system according to claim 46, wherein:

said sum of S and N is approximately 50.

48. A system according to claim 43, wherein:

said F(SN) is a minimum SNR value for said carriers of said multicarrier signal.

49. A system according to claim 43, wherein:

said F(SN) is a SNR value chosen from a predetermined index of a SNR values.

50. A system according to claim 49, wherein:

said SNR values for a plurality (N) of carriers of said multicarrier signal are in value order and F(SN)=$SNR_{rP}$, where r indicates that said carriers are in value order, P is a predetermined index, and 1<P<N.

51. A system according to claim 33, wherein:

said second telecommunications apparatus has a physical layer and a media access control (MAC) layer, said physical layer including said means for measuring an indication of a signal-to-noise ratio (SNR), and said MAC layer including said means for utilizing said SNR to determine a mode assignment for said system.

* * * * *